(12) United States Patent
Ko et al.

(10) Patent No.: US 7,348,533 B2
(45) Date of Patent: Mar. 25, 2008

(54) UNIT PIXEL OF CMOS IMAGE SENSOR

(75) Inventors: Joo Yul Ko, Kyungki-Do (KR); Won Tae Choi, Kyungki-Do (KR); Deuk Hee Park, Seoul (KR); Shin Jae Kang, Kyungki-Do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 11/458,018

(22) Filed: Jul. 17, 2006

(65) Prior Publication Data
US 2007/0023612 A1 Feb. 1, 2007

(30) Foreign Application Priority Data
Jul. 26, 2005 (KR) ............ 10-2005-0067876

(51) Int. Cl.
*H01L 27/00* (2006.01)

(52) U.S. Cl. .............. 250/208.1; 348/243; 348/308; 257/292

(58) Field of Classification Search ............ 250/208.1, 250/214 R, 214 C; 348/241, 243, 294, 301, 348/308; 257/290–292
See application file for complete search history.

(56) References Cited

U.S. PATENT DOCUMENTS 6,246,043 B1 * 6/2001 Merrill ............... 250/208.1
2006/0146161 A1 * 7/2006 Farrier ................ 348/308

* cited by examiner

*Primary Examiner*—Kevin Pyo
(74) *Attorney, Agent, or Firm*—Lowe Hauptman Ham & Berner

(57) ABSTRACT

In a unit pixel of a CMOS image sensor which compensates for a dark current generated in a photo diode to enhance its driving range, the photo diode generates a charge in accordance with a received light amount. A drive transistor has a gate for receiving the charge in the photo diode to output as an electrical signal, and a drain to which a power voltage is applied. A saturation detector receives a gate voltage of the drive transistor and judges the drive transistor saturated if an output voltage is smaller than a preset reference voltage. A switch connects or disconnects between the power voltage and the gate of the drive transistor in response to the judgment of the saturation detector.

7 Claims, 3 Drawing Sheets

(a)

(b)

UNIT PIXEL OF CMOS IMAGE SENSOR

CLAIM OF PRIORITY

This application claims the benefit of Korean Patent Application No. 2005-67876 filed on Jul. 26, 2005 in the Korean Intellectual Property Office, the disclosure of which is incorporated herein by reference.

BACKGROUND OF THE INVENTION

1. Field of the Invention

The present invention relates to a unit pixel of a Complementary Metal Oxide Semiconductor (CMOS) image sensor, more particularly, which provides a current compensating for a dark current to a photo diode to prevent a drive transistor from being quickly saturated by the dark current of the photo diode, thereby increasing a dynamic range.

2. Description of the Related Art

In general, each part of objects present in the natural world differs in brightness and wavelengths of light. An image sensor is a device that converts different brightness and wavelengths of the objects into an electrical value of a signal processable level, using photo-reactive properties of semiconductors.

Typically, the image sensor is used at a per-pixel level. A plurality of image sensors are aligned on a line of certain standard to produce a pixel array. Then images of a certain standard are picked up via the pixel array.

The aforesaid image sensor includes a photo-reactive semiconductor device and a plurality of transistors for outputting an electrical change of the semiconductor device as an electrical signal of a certain level.

FIG. 1 is a circuit diagram illustrating a unit pixel of a general CMOS image sensor according to the prior art. Referring to FIG. 1, the CMOS image sensor includes a photo diode PD for changing a capacity value in response to light, a reset transistor Q1 for resetting the photo diode PD to detect a next signal, a drive transistor Q2 for acting as a source follower via an electrical signal stored in the photo diode PD and a select transistor Q3 for selecting an output of a detected value.

That is, if the reset transistor Q1 stays on for a predetermined duration in response to a reset signal Rx, charges remaining in the photo diode PD are released and the photo diode PD is emptied so that current is stored in the photo diode PD at an amount proportionate to the capacity value corresponding to light. In addition, the transistor Q2 amplifies a voltage of the photo diode PD into the electrical signal (output voltage) within a set range to output. The output voltage from the drive transistor Q2 is outputted in the addressing order of a pixel array if the select transistor Q3 is turned on.

In this conventional CMOS image sensor, the photo diode PD, even though not exposed to light at all, generates a dark current which is a leakage current. That is, the dark current causes the drive transistor Q2 to generate the output voltage, even if not receiving light at all.

Such a dark current is supplied to the drive transistor Q2, thereby shortening a saturation time of the driver transistor Q2. In a further explanation, the dark current is combined with current generated when the photo diode PD receives light, thereby shortening a saturation time. Disadvantageously, the dark current generated in the photo diode PD reduces a driving range of the CMOS image sensor.

Especially, the dark current, which is considerably sensitive to temperature, substantially doubles or more with 10□ increase in its ambient temperature. As a result, the dark current further reduces a driving range of the CMOS image sensor.

In a conventional method to overcome the dark current-induced problem, an average value of the dark current generated in a dark pixel was calculated to compensate for an output of a non-dark pixel. However, according to such a conventional technology, the dark current generated in each pixel is not decreased but subtraction is performed externally based on a formula so that the unit pixel, if saturated, is inevitably degraded.

SUMMARY OF THE INVENTION

The present invention has been made to solve the foregoing problems of the prior art and therefore an object according to certain embodiments of the present invention is to provide a unit pixel of a CMOS image sensor which detects an output voltage of a drive transistor and supplies a compensating current to a photo diode if the output voltage is lowered to a reference voltage or less, thereby compensating for a dark current generated in the photo diode.

According to an aspect of the invention for realizing the object, there is provided a unit pixel of a complementary metal oxide semiconductor image sensor comprising: a photo diode for generating and storing a charge in accordance with a received light amount; a drive transistor having a gate for receiving the charge in the photo diode and a source for outputting the received charge as a voltage value and a drain to which a power voltage is applied; a saturation detector for receiving a source voltage from the drive transistor and judging the drive transistor saturated if the source voltage is smaller than a preset reference voltage; and a switch for connecting or disconnecting between the power voltage and the gate of the drive transistor in response to the judgment of the saturation detector.

According to an embodiment of the invention, preferably, the switch comprises a switching transistor having a gate connected to an output terminal of the saturation detector, a drain connected to the power voltage and a source connected to the drain of the drive transistor.

At this time, the saturation detector comprises: an inverter having an input terminal connected to the source of the drive transistor; and a feedback line for supplying an output of the inverter to the gate of the switching transistor.

The inverter comprises: an n-channel Metal Oxide Semiconductor Field Effect Transistor (MOSFET); and a p-channel MOSFET, wherein the n-channel MOSFET has a gate connected to a gate of the p-channel MOSFET to constitute the input terminal of the inverter, the n-channel MOSFET has a drain connected to a drain of the p-channel MOSFET to constitute an output terminal of the inverter, the n-channel MOSFET has a source connected to the power voltage, and the p-channel MOSFET has a source connected to a ground.

According to another embodiment of the invention, the saturation detector comprises a comparator for comparing the source voltage of the drive transistor with the preset reference voltage and turning on the switching transistor if the source voltage of the drive transistor is smaller than the reference voltage.

According to further another embodiment of the invention, the unit pixel further comprises a reset transistor for releasing the charge stored in the photo diode in response to a reset signal provided by a gate, the reset transistor having a drain connected to the power voltage and a source connected to the photo diode.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
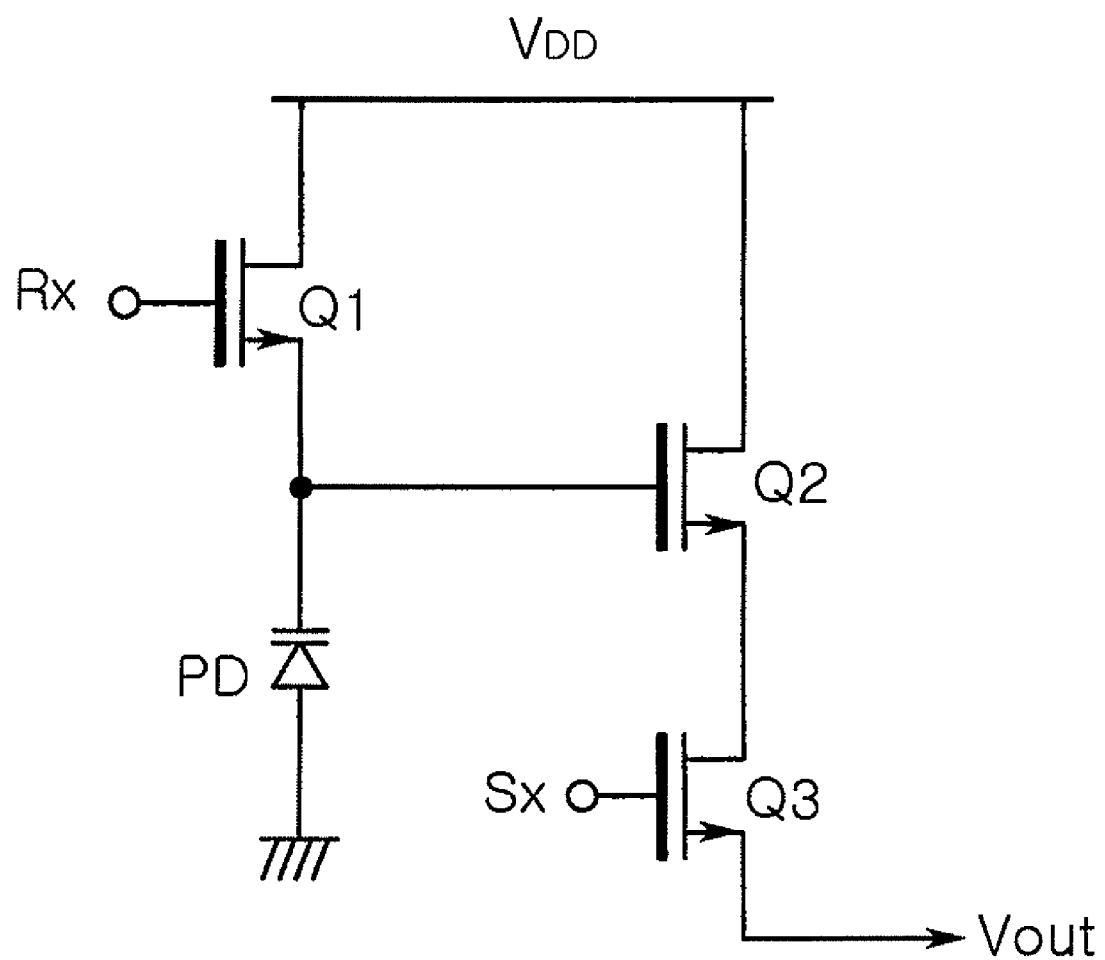
FIG. 1 is a circuit diagram illustrating a unit pixel of a CMOS image sensor according to the prior art.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout.

Figure 2:
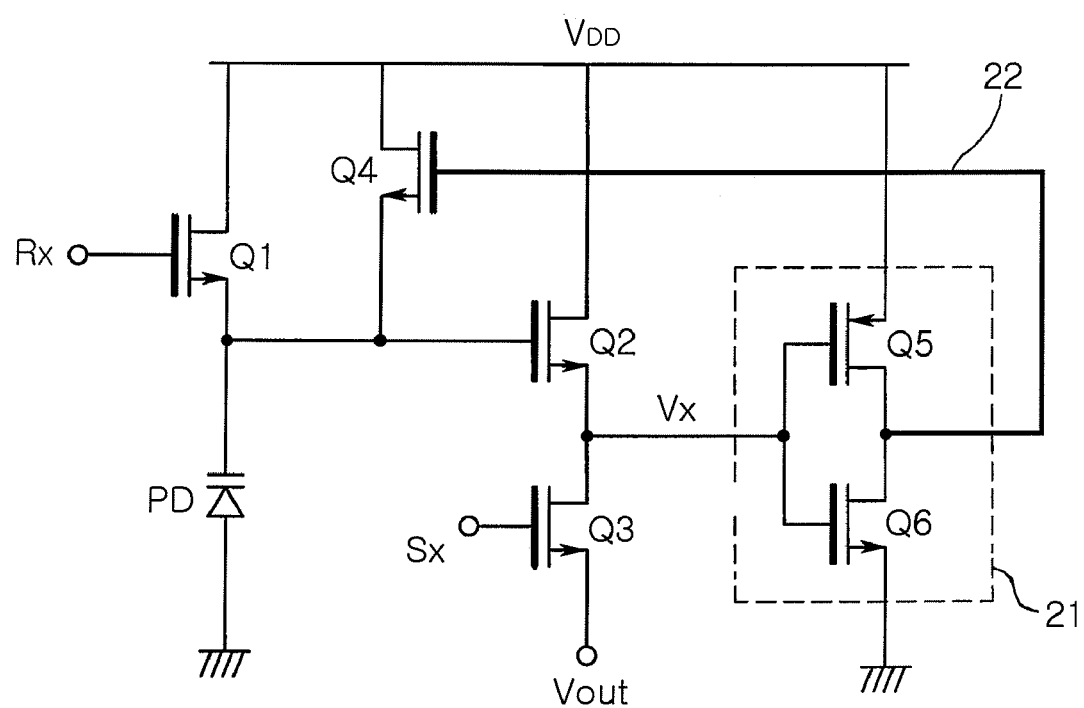
FIG. 2 is a circuit diagram illustrating a unit pixel of a CMOS image sensor according to an embodiment of the invention.

FIG. 2 is a circuit diagram illustrating a unit pixel of a Complementary Metal Oxide Semiconductor (CMOS) according to an embodiment of the invention. Referring to FIG. 2, the unit pixel of the CMOS image sensor according to an embodiment of the invention includes a photo diode PD, a drive transistor Q2, a saturation detector 21 and 22, a switching transistor Q4, a reset transistor Q1 and a select transistor Q3. The photo diode PD generates and stores charges in accordance with a received light amount. The drive transistor Q2 has a gate for receiving the charges from the photo diode as an electrical signal and a drain to which a power voltage is applied. The saturation detector includes an inverter 21 having an input terminal connected to the source of the drive transistor Q2, and a feedback line 22 connected to an output terminal of the inverter 21 for supplying an output of the inverter 21. The switching transistor Q4 has a gate connected to the feedback line 22, a drain connected to the power voltage $V_{DD}$, and a source connected to the gate of the drive transistor Q2. Also, the reset transistor Q1 has a drain connected to the power voltage $V_{DD}$ and a source connected to the photo diode PD. The reset transistor Q1 releases the charges stored in the photo diode PD in response to a reset signal Rx provided by a gate. In addition, the select transistor Q3 outputs an output voltage of the drive transistor Q2 in the addressing order of a pixel away at its turn-on in response to a selection signal Sx provided to the gate.

Referring to this embodiment of FIG. 2, the invention further includes a saturation detector 21 and 22 and a switch Q4 in addition to constituents of the conventional unit pixel of the CMOS image sensor. The saturation detector 21 and 22 feeds back a sensed output voltage of the image sensor to detect whether or not the sensed output voltage is beyond a limited level and a switch Q4 switches on/off in response to the judgment of the saturation detector 21 and 22 to supply a compensating current to the photo diode PD.

According to this embodiment, the switch is configured as a switching transistor Q4 having a gate connected to an output terminal of the saturation detector, a drain connected to the power voltage and a source connected to the gate of the drive transistor. The switching transistor Q4, if turned on by an output of the saturation detector, connects the photo diode PD with the power voltage $V_{DD}$. This allows current to flow inversely with respect to the photo diode PD, thereby compensating for a dark current present in the photo diode PD. Hereinafter, current supplied to the photo diode PD with the switch (i.e., the switching transistor Q4) turned on is referred to as a compensating current.

The saturation detector is comprised of the inverter 21 and feedback line 22. At this time, the inverter 21 is configured as an n-channel MOSFET Q5 and a p-channel MOSFET Q6. The n-channel MOSFET Q5 has a gate connected to a gate of the p-channel MOSFET Q6 to constitute an input terminal. Likewise, the n-channel MOSFET Q5 has a drain connected to a drain of the p-channel MOSFET Q6 to constitute an output terminal. The n-channel MOSFET Q5 has a source connected to the power voltage $V_{DD}$ and the p-channel MOSFET Q6 has a source connected to a ground.

According to another embodiment of the invention, the inverter 21 may be substituted by a comparator for comparing whether the output voltage of the drive transistor Q2 is smaller than a preset reference voltage. In this case, the comparator receives the output voltage of the drive transistor Q2 and the preset reference voltage, and its output is connected to the switching transistor Q4 through the feedback line 22. Thereby the comparator turns on/off the switching transistor Q4 in response to the comparison result. The saturation detector confirms whether or not the output voltage of the drive transistor Q2 is beyond a limited level. Accordingly, the aforesaid inverter 21 and comparator can be substituted by other structure which can turn on/off the switching transistor Q4.

Figure 3:
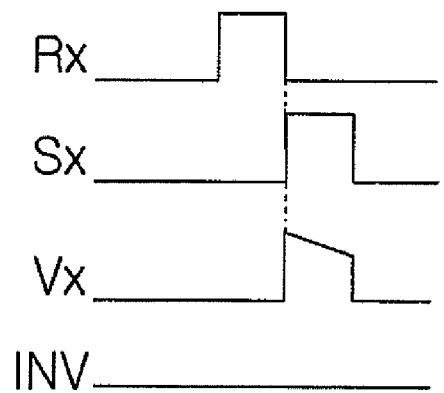
FIG. 3 is a timing diagram for explaining operation of a unit pixel of a CMOS image sensor according to an embodiment of the invention.
Figure 3:
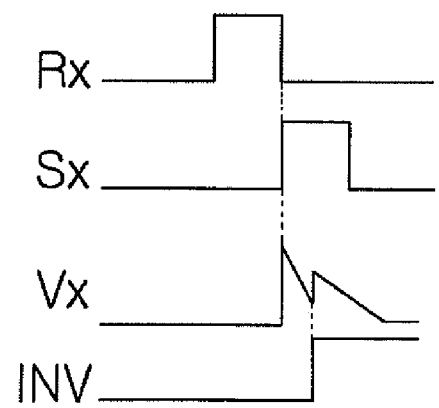

FIG. 3 is a timing diagram for explaining operations of a unit pixel of a CMOS image sensor according to an embodiment of the invention. The operations of the unit pixel of the CMOS image sensor will be explained according to the embodiment of the invention with reference to FIGS. 2 and 3.

First, referring to FIGS. 2 and 3(a), with a reset signal Rx having a predetermined on-duty time applied, a reset transistor Q2 is turned on to release charges stored in the photo diode PD, thereby ready to receive and detect new light. Then, at a falling edge of the reset signal Rx, the photo diode PD is exposed to light, thereby generating and storing charges at an amount proportionate to the exposed light amount and wavelength. A value stored is amplified at a given gain by the drive transistor Q2 which acts as a source follower. The stored value is outputted via the turned-on select transistor Q3 while a select signal Sx is applied.

During repetition of the aforesaid operations, in case where the light amount is increased beyond a limited level, as shown in FIG. 3(b), the output voltage Vx of the drive transistor Q2 is lowered to a reference level or less. Correspondingly, an output of the inverter 21 becomes a high level and turns on the switching transistor Q4 to provide a compensating current to the photo diode PD. The compensating current compensates for a dark current of the photo diode PD so that the drive transistor Q2 is prevented from being saturated. That is, this boosts a driving range of the unit pixel of the CMOS image sensor.

The aforesaid operations are carried out for each CMOS image sensor at a per-pixel level. In case of a pixel array configured with such image sensors, the image sensor operates as described above in accordance with the amount of light incident at each pixel level. Thus, the compensating current is provided to the photo diode in some portions of an overall image if they have too much incident light, thereby preventing saturation. Also, in other portions where light enters within a set range, the image sensor operates normally, thus ensuring color reproduction substantially true to life. This enhances overall image definition. Especially, the invention compensates for an increasing dark current caused by a rising ambient temperature of the CMOS image sensor. This prevents saturation of the overall image sensor, enhancing a driving range thereof.

As set forth above, a unit pixel of a CMOS image sensor of the invention directly provides a compensating current to a photo diode to compensate for a dark current generated in a photo diode of the unit pixel of the CMOS image sensor, improving a driving range of the pixel.

Also, the invention allows the dark current to be decreased, thereby reducing noises arising thereform and increasing a ratio of signals to noises.

In addition, the invention directly eliminates a dark current resulting from a rising temperature through a compensating current, thus applicable to a specific high temperature environment.

While the present invention has been shown and described in connection with the preferred embodiments, it will be apparent to those skilled in the art that modifications and variations can be made without departing from the spirit and scope of the invention as defined by the appended claims.

What is claimed is:

1. A unit pixel of a complementary metal oxide semiconductor image sensor comprising:
    a photo diode for generating and storing a charge in accordance with a received light amount;
    a drive transistor having a gate for receiving the charge from the photo diode and a source for outputting the received charge as a source value and a drain to which a power voltage is applied;
    a saturation detector for receiving source voltage from the drive transistor and judging the drive transistor saturated if the source voltage is smaller than a preset reference voltage; and
    a switch for connecting or disconnecting between the power voltage and the gate of the drive transistor in response to the judgment of the saturation detector.

2. The unit pixel according to claim 1, wherein the switch comprises a switching transistor having a gate connected to an output terminal of the saturation detector, a drain connected to the power voltage and a source connected to the gate of the drive transistor.

3. The unit pixel of according to claim 2, wherein the saturation detector comprises:
    an inverter having an input terminal connected to the source of the drive transistor; and
    a feedback line for supplying an output of the inverter to the gate of the switching transistor.

4. The unit pixel according to claim 3, wherein the inverter comprises:
    an n-channel Metal Oxide Semiconductor Field Effect Transistor (MOSFET); and
    a p-channel MOSFET,
    wherein the n-channel MOSFET has a gate connected to a gate of the p-channel MOSFET to constitute the input terminal of the inverter, the n-channel MOSFET has a drain connected to a drain of the p-channel MOSFET to constitute an output terminal of the inverter, the n-channel MOSFET has a source connected to the power voltage, and the p-channel MOSFET has a source connected to a ground.

5. The unit pixel according to claim 2, wherein the saturation detector comprises a comparator for comparing the source voltage of the drive transistor with the preset reference voltage and turning on the switching transistor if the source voltage of the drive transistor is smaller than the preset reference voltage.

6. The unit pixel according to claim 1, further comprising a reset transistor for releasing the charge stored in the photo diode in response to a reset signal provided at a gate of said re-set transistor, the reset transistor further having a drain connected to the power voltage and a source connected to the photo diode.

7. A unit pixel of a complementary metal oxide semiconductor image sensor comprising:
    a photo diode for generating and storing a charge in accordance with a received light amount;
    a drive transistor having a gate for receiving the charge from the photo diode to output as an electrical signal and a drain to which a power voltage is applied;
    a saturation detector comprising an inverter having an input terminal connected to a source of the drive transistor and a feedback line connected to an output terminal of the inverter for supplying an output of the inverter;
    a switching transistor having a gate connected to the feedback line, a drain connected to the power voltage and a source connected to the gate of the drive transistor; and
    a reset transistor for releasing the charge stored in the photodiode in response to a reset signal provided at a gate of said re-set transistor, the reset transistor further having a drain connected to the power voltage and a source connected to the photo diode.

* * * * *